(12) United States Patent
Zhang et al.

(10) Patent No.: US 10,103,909 B2
(45) Date of Patent: Oct. 16, 2018

(54) CHANNEL ESTIMATION METHOD

(71) Applicant: AMLOGIC (SHANGHAI) CO., LTD., Shanghai (CN)

(72) Inventors: Jinhong Zhang, Shanghai (CN); Jin Niu, Shanghai (CN); Xiaotong Liu, Shanghai (CN); Chun Wang, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/560,097

(22) PCT Filed: Apr. 18, 2017

(86) PCT No.: PCT/CN2017/080921
§ 371 (c)(1),
(2) Date: Sep. 20, 2017

(87) PCT Pub. No.: WO2017/190589
PCT Pub. Date: Nov. 9, 2017

(65) Prior Publication Data
US 2018/0191533 A1     Jul. 5, 2018

(30) Foreign Application Priority Data

May 6, 2016   (CN) .......................... 2016 1 0298413

(51) Int. Cl.
*H04L 25/02* (2006.01)
*H04L 25/03* (2006.01)

(52) U.S. Cl.
CPC ........ *H04L 25/03305* (2013.01); *H04L 25/02* (2013.01); *H04L 25/0228* (2013.01); *H04L 2025/03414* (2013.01)

(58) Field of Classification Search
CPC ........... H04L 25/03305; H04L 25/0228; H04L 2025/03414
See application file for complete search history.

(56) References Cited

U.S. PATENT DOCUMENTS

| 8,582,676 B1 * | 11/2013 | Zhang | ................. H04L 27/2657 375/260 |
| 2005/0276360 A1 * | 12/2005 | Fujii | .................... H04L 1/0006 375/347 |
| 2008/0025418 A1 * | 1/2008 | Liu | ....................... H04L 1/0045 375/260 |

(Continued)

*Primary Examiner* — Dac Ha
(74) *Attorney, Agent, or Firm* — Levenfeld Pearlstein, LLC

(57) ABSTRACT

The invention relates to the field of terrestrial broadcast transmission, more specifically, to a channel estimation method. A channel estimation method used for estimating a channel of a next carrier signal frame, the channel estimation method comprising: equalizing a carrier of the current signal frame and of the channel of the current signal frame, to obtain a transmission sequence of the current signal frame and a signal-to-noise ratio of the current signal frame, calculating the transmission sequence to get the reference channel, generating an initial channel estimation based on the signal-to-noise ratio of the signal frame, processing the estimated initial channel and the reference channel by an adaptive filtering method, to obtain an estimated channel of next signal frame.

7 Claims, 2 Drawing Sheets

(56) References Cited

U.S. PATENT DOCUMENTS

| | | | |
|---|---|---|---|
| 2008/0049600 A1* | 2/2008 | Liu | H04L 25/0212 370/208 |
| 2008/0075182 A1* | 3/2008 | Hsieh | H04L 25/022 375/260 |
| 2010/0149990 A1* | 6/2010 | Kim | H04L 25/0228 370/241 |
| 2015/0124911 A1* | 5/2015 | Wicker, Jr. | H04L 25/0242 375/340 |

* cited by examiner

CHANNEL ESTIMATION METHOD

CROSS-REFERENCE TO RELATED APPLICATIONS

The present application claims priority to and the benefit of Chinese Patent Application No. CN 201610298413.1, filed on May 6, 2016, the entire content of which is incorporated herein by reference.

BACKGROUND OF THE INVENTION

1. Field of the Invention

The invention relates to the field of terrestrial broadcast transmission, more specifically, to a channel estimation method.

2. Description of the Related Art

The present channel estimation method is that, the input signal passes through the correlator or through frequency-domain division to obtain the initial channel estimation; then the initial channel estimation is filtered by a fixed coefficient filter to implement frequency-domain filtering, so as to get channel estimation; or the initial channel estimation is implemented by a time-domain selection multipath, so as to get channel estimation.

However, in the prior art, the initial channel estimation has a poor quality as there is a signal interfering with a PN. In the process of channel estimation, the fixed coefficient filtering cannot obtain the best channel estimation as the channel property is unknown. Therefore, the channel estimation can only passes through a most conservative low-pass filtering, thus the in-band noise cannot be removed. In addition, the selection of multi-path will lead to poor robustness, and many small multipath are difficult to be picked, resulting in a significant decline in performance.

SUMMARY OF THE INVENTION

For the deficiencies of the prior art, the present invention provides a channel estimation method capable of improving the performance of a receiver in a multipath channel environment with low signal-to-noise ratio and difficult to distinguish.

The invention utilizes the following technical scheme.

A channel estimation method for estimating a channel of a next carrier signal frame, comprising:

equalizing a carrier of a current signal frame and of a channel of the current signal frame, to obtain a transmission sequence of the current signal frame and a signal-to-noise ratio of the current signal frame, and calculating the transmission sequence to get a reference channel;

completing an initial channel estimation based on the signal-to-noise ratio of the signal frame; and processing the estimated initial channel and the reference channel through an adaptive filtering method, to obtain the estimated channel of the next signal frame.

Preferably, in the channel estimation method, the signal frame comprises a PN sequence and a data block connected to a tail of the PN sequence, wherein the length of the PN sequence is constant.

Preferably, in the channel estimation method, the signal frame is a baseband signal proceeded with an analog-to-digital conversion, a frequency conversion, a filtering, and a sampling rate conversion; and a rate of the baseband signal is a single symbol rate.

Preferably, in the channel estimation method, the method for obtaining the signal-to-noise ratio and the reference channel comprising:

removing a hangover of the PN sequence in the current signal frame;

adding the hangover of the data block of the current signal frame in a head of the PN sequence of the next signal frame to the data block of the current signal frame;

obtaining a reconstructed circular convolution signal (wherein, the circular convolution signal is the signal that satisfies circular convolution).

Preferably, in the channel estimation method, the method for obtaining the signal-to-noise ratio and the reference channel further comprising:

obtaining an estimated transmission sequence according to the channel of the circular convolution signal, through a hard decision of a slicer function; and calculating the transmission sequence to get the reference channel.

Preferably, in the channel estimation method, the method for generating an initial channel estimation comprising:

removing a frame header of the PN sequence of the current signal frame via the slicer function, wherein the removed frame header of the PN sequence of the current signal frame is an interference with the head of the PN sequence of the current signal frame from the hangover of the data block of the previous signal frame;

removing the hangover of the tail of the PN sequence of the current signal frame in the head of the data block of the current signal frame; and obtaining a linear convolution signal (wherein the linear convolution signal is the signal satisfying the structure of the linear convolution).

Preferably, in the channel estimation method, the method for generating an initial channel estimation further comprising:

executing a frequency-domain division to the multipath signal, the PN sequence of the linear convolution signal, and the estimated signal-to-noise ratio, to obtain a frequency-domain response of the current signal frame channel (Wherein the multipath signal is the multipath signal of the PN sequence of the linear convolution signal).

Preferably, in the channel estimation method, the method for completing an initial channel estimation further comprising:

Filtering and/or sampling the frequency-domain response of the current signal frame channel, to obtain an initial channel.

Preferably, in the channel estimation method, updating a coefficient for all subcarriers of the current signal frame based on the initial channel and the reference channel, and generating a channel estimation of the next signal frame by using the updated coefficient.

The beneficial effects of the present invention are:

The invention can obtain a better initial channel estimation by removing the data from the signal frame and then implementing the minimum mean squares error frequency-domain division to the linear convolution signal. The initial channel estimation goes through an adaptive filtering to obtain the best channel estimation. In the present invention, the interference in the signal frames and between the signal frames is eliminated, and the performance of the receiver can be improved.

BRIEF DESCRIPTIONS OF THE DRAWINGS

The accompanying drawings, together with the specification, illustrate exemplary embodiments of the present disclosure, and, together with the description, serve to explain the principles of the present invention.

FIG. 1 is a frame structure of a DTMB (Digital Terrestrial Multimedia Broadcast) system of the present invention;

DETAILED DESCRIPTION

Figure 1:
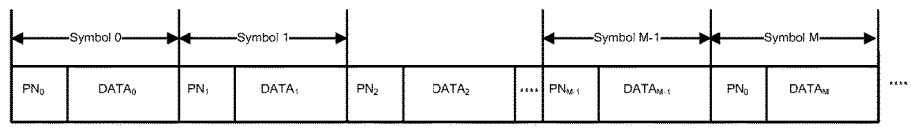

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

As shown in FIG. 1, the signal frame (hereinafter referred to as Symbol) of the embodiment includes a frame header and a frame body, and the frame header may be a PN sequence (hereinafter referred to as PN), and the frame body may be a data block (hereinafter referred to as data). Between each of the signal frames, the data of the previous signal frame is connected to the PN of the next signal frame. For example, as shown in FIG. 1, the data 0 of the previous signal frame symbol 0 is connected to the PN1 of the next signal frame symbol 1, and so on, which need not to be repeated. There are three possibilities for the PN sequence of the embodiment, which are PN420, PN595 and PN945, respectively, and the corresponding length of the PN sequence is 420, 595 and 945 respectively. The PN of each symbol may be invariant or variant. The embodiment only describes the situation in which the PN is invariant.

Figure 2:
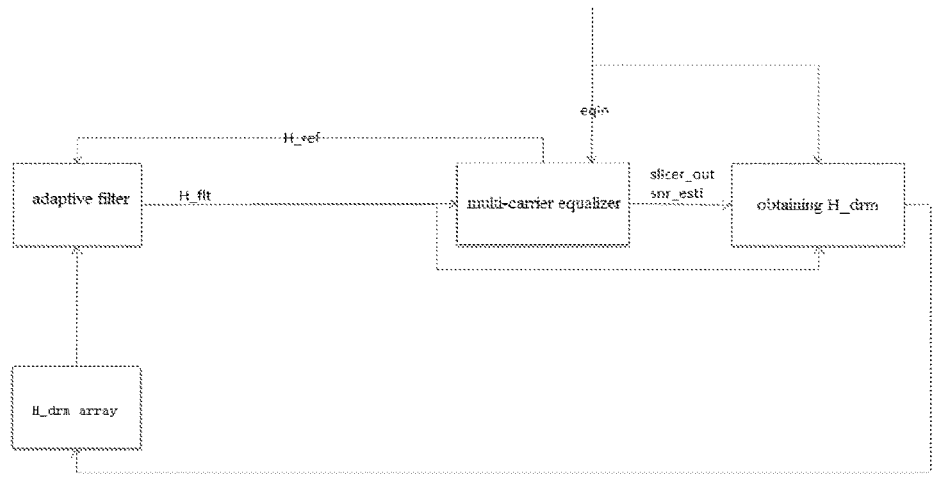
FIG. 2 is a channel estimation and equalization of the multi-carrier of the present invention.

The DATA of this embodiment has two possibilities, which correspond to single carrier and multi carrier respectively. The length of the data is 3780. If DATA is single carrier, the PNs in each symbol are consistent, and they constitute circular correlation. In this embodiment, for all the operational lengths fftlen of the FFT and IFFT (Fast Fourier transform and Inverse Fast Fourier transform) related to the embodiment, and the length of the data is 3780. FIG. 2 is the channel estimation and equalization of the multi-carrier, divided into three parts, 1. equalization; 2. the initial channel (H_drm) acquisition; 3. adaptive filtering.

The multi-carrier equalizer in FIG. 2 can select an arbitrary method (e.g., MMEQ) through the known signal frame (eqin) and the channel estimation H_flt to equalize, so as to obtain the estimated transmission sequence (slicer_out) and SNR (Signal to Noise Ratio) of the current signal frame: the estimated snr_esti.

In the figures, the eqin is a signal proceeded with an analog-to-digital conversion (ADC), and is converted into a baseband signal after proceeded with down-conversion, filtering, and sampling rate conversion. The signal rate is a single symbol rate. In the DTMB system, the rate is 7.56 MHz.

In this embodiment, the multi-carrier equalization mainly includes the steps of PN removal, transmitted signal estimation, H_ref calculation, SNR estimation and so on.

Figure 3:
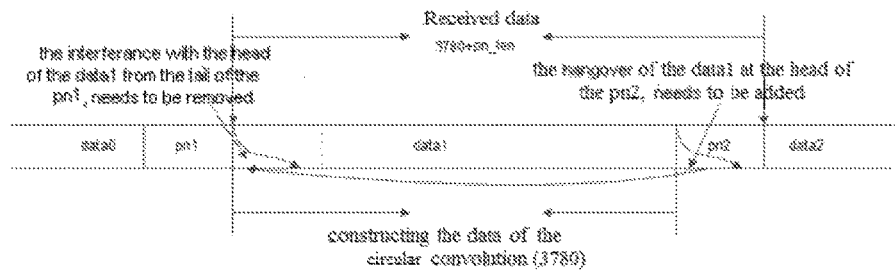
FIG. 3 is a schematic diagram of removing a PN sequence of the present invention.

1.1: The function of PN removal is to remove the PN in eqin, and then reconstruct the signal to meet their requirement of circular convolution, as shown in FIG. 3:

$$Pn2\_x\_h1 = pn2 \% \otimes h1$$

$\otimes$ is a linear convolution, we can use FFT to achieve this calculation.

$$PN2 = \text{fft}([pn2 \ \text{zeros}(3780-pn\_len)]);$$

This is a backward zero padding of pn2 to the length of 3780, then do the fft.

$$PN2\_x\_H1 = PN2 * H1;$$

H1 is the channel response estimation of data1, which is the output of the adaptive filter at the data1 symbol.

$$Pn1\_x\_h0 = \text{ifft}(PN1\_x\_H0);$$

$$PN1 = \text{fft}([pn1 \ \text{zeros}(3780-pn\_len)]);$$

This is a backward zero padding of pn1 to the length of 3780, then do the fft.

$$PN1\_x\_H0 = PN1 * H0;$$

$$Pn1\_x\_h0 = \text{ifft}(PN1\_x\_H0);$$

H0 is the channel response estimation of data0, which is the output of the adaptive filter in the data0 symbol.

Path_dist is multipath length, which is estimated by other modules.

$$y = \text{eqin}(0:Path\_dist+3780-1);$$

eqin (0) is the first sample point of data1 transmitted by the first multipath.

data_tail(0:Path_dist −1)=y(3780:3780+Path_dist−1)−
pn2_x_h1(0:Path_dist−1);

y(0:Path_dist−1)=y(0:Path_dist−1)+data_tail(0:Path-
_dist−1)−pn1_x_h0(pn_len:pn_len+Path_dist−
1);

y will be sent to the transmitted signal estimation module for the next step.

1.2 Transmitting Signal Estimation:

Y=fft(y)

SLICER_IN=Y/H_flt

SLICER_OUT=slicer(SLICER_IN);

slicer_out=ifft(SLICER_OUT)

The slicer function is a hard decision, that is, the output is the point closest to the input signal on the constellation.

1.3 H_Ref Estimation:

H_ref=Y/SLICER_OUT;

In the second step, the initial channel (H_drm) is acquired, and H_drm is obtained by removing the estimated time-domain transmission signal in eqin, and then performing channel estimation.

Figure 4:
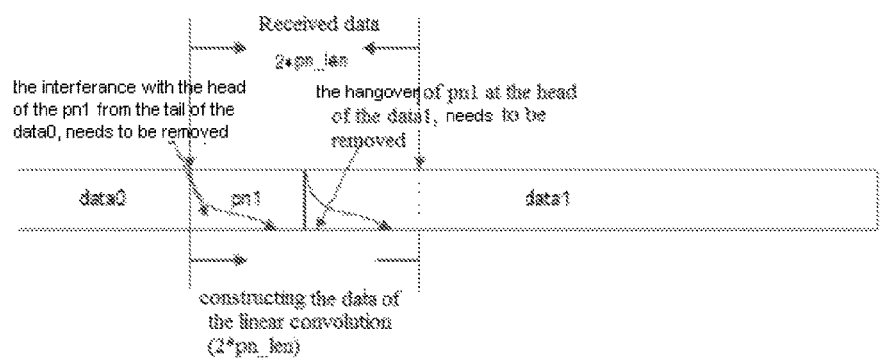
FIG. 4 is a schematic diagram of removing data block of the present invention.

2.1: Data Removal, as Shown in FIG. 4:

X=fft([sclier_out(0:pn_len-1)zeros(3780-pn_len]);

This is backward zero-padding slicer_out(0:pn_len-1) to the length of fftlen, then do the fft.

DATA1_HEAD=X*H1;

data1_head=ifft(DATA1_HEAD);

H1 is the channel response estimation for data1, which is the output of the adaptive filter in the data1 symbol, which is the same as the H_flt used in the equalization.

X=fft([zeros(3780-pn_len)

sclier_out(3780-pn_len:3780-1)]);

This is forward zero-padding slicer_out(3780-pn_len: 3780-1) to the length of fftlen, then do the fft.

DATA1_TAIL=X*H1;

data1_tail=ifft(DATA1_TAIL);

data1_tail is the tail of the current signal frame and is used when calculating the data removal for the next frame.

When we get data1_head, we can do the data removal calculation for pn1.

r=[eqin(-pn_len:pn_len-1)];

wherein r contains all of the multipath signals of pn1.

r(0:pn_len-1)=r(0:pn_len-1)-data0_tail(0:pn_len-1);

r(pn_len:2*pn_len-1)=r(pn_len:2*pn_len-1)− data1_head(0:pn_len-1);

wherein data0_tail is the tail of the previous frame signal.

2.2 Frequency-Domain Division:

We know that by inputting r, pn, and snr_esti, we can complete the channel estimation by frequency-domain division.

Zero-padding the pn to the length of fftlen, then do fft, so that X is obtained.

Zero-padding the r to the length of fftlen, then do the fft, so that Y is obtained.

$$Xavg = \sum_{i=0}^{fftlen-1} \text{abs}(X[i])^2$$

$$noisePow = \frac{Xavg}{fftlen} / \text{snr\_esti}$$

$$cof = \frac{1}{fftlen} * \sum_{i=0}^{fftlen-1} \frac{\text{abs}(X[i])^2}{\text{abs}(X[i])^2 + noisePow}$$

$$H\_drm\_c[i] = \frac{Y[i] * X[i]^*}{(\text{abs}(X[i])^2 + noisePow) * cof}$$

$$0 \le i < fftlen$$

2.3 Filtering and Sampling

After filtering and sampling the H_drm_c, H_drm is obtained. H_drm_c is the frequency-domain response to the channel. Generally, the length of the multipath channel does not exceed the length pnlen of the pn sequence, otherwise the ISI interference between DATA will occur. Therefore, the noise of H_drm_c can be filtered by filtering. The bandwidth of the filter is pnlen. This function can be achieved by designing a filter, it can also be achieved by fft transform. The fft transform is essentially a filter as well. The method of fft transform filtering are as follows:

$$h1 = \text{ifft}(H\_drm\_c)$$

$$h2(n) = \begin{cases} h1(n) & n < pnlen \\ 0 & others \end{cases}$$

$$H\_drm\_f = \text{fft}(h2)$$

In order to save the space for data storage, after the H_drm_f is sampled, the H_drm_f is then used for adaptive filtering.

$$H\_drm[i] = \begin{cases} H\_drm\_f[i] & i \% ds\_ratio = 0 \\ 0 & others \end{cases}$$

Wherein, ds_ratio is the sampling rate, and the value principle is an integer less than 3780/pnlen.

The third step is: adaptive filtering.

Figure 5:
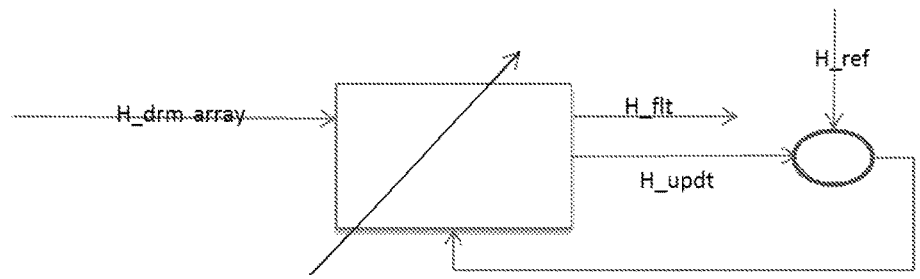
FIG. 5 is a schematic diagram of the adaptive filtering of the present invention.

So far, H_drm and H_ref have been obtained, and the channel estimation H_flt can be obtained by the method of adaptive filtering. As shown in FIG. 5, H_drm is the input signal, and the final output signal is generated by adaptive filtering. H_ref is the reference signal. Adaptive filtering can be implemented by a variety of methods, such as LMS and RLS and so on. The following is illustrated in LMS as an example. Usually, LMS is divided into two parts, filtering (generating H_updt) and the coefficient updating (updating coeff). In this context, on the basis of these two parts, it is necessary to add a new part, generating new data (generating H_flt); the array idx indicates the values range of the filter.

idx=[-pre:post];

With respect to all subcarriers m (in is 0<=m<fftlen), the following three formulas can be used to update the coefficients. H_drm_array [n, m] indicates the channel response H_drm [m] of the subcarrier m generated by the signal of the $n^{th}$ symbol. For example, after the symbol n completed equalization, the H_drm and H_ref of the $n^{th}$ symbol are obtained, and then performing the coefficient update.

$$H\_updt[m] = \sum_{idx} coeff[idx] * H\_drm\_array[n-1, idx+m]$$

$err[m]=H\_ref[m]-H\_updt[m];$

Performing a coefficient update for all coeff:

$coeff[idx]=coeff[idx]+stepsize*err[m]$ $*H\_drm\_array[n-1,idx+m]*$

Wherein, Stepsize is the step length of the coefficient update, it can be transcendentally configured according to the requirement.

After updating the coefficients for all subcarriers, the new coeff can be used to generate the channel estimation H_flt of the next symbol n+1, and the formula for generating the H_flt of the subcarrier m is as follow:

$$H\_flt[m] = \sum_{idx} coeff[idx] * H\_drm\_array[n, idx+m]$$

In conclusion, the invention can obtain a better initial channel estimation by removing the data from the signal frame and then executing the minimum mean squares error frequency-domain division to the linear convolution signal. The initial channel estimation goes through an adaptive filtering to obtain the best channel estimation. In the present invention, the interference in the signal frames and between the signal frames is eliminated, and the performance of the receiver can be improved.

The foregoing is only the preferred embodiments of the invention, not thus limiting embodiments and scope of the invention, those skilled in the art should be able to realize that the schemes obtained from the content of specification and figures of the invention are within the scope of the invention.

What is claimed is:

1. A channel estimation method used for estimating a channel of a next carrier signal frame, comprising:
    equalizing a carrier of a current signal frame and of a channel of the current signal frame, to obtain a transmission sequence of the current signal frame and a signal-to-noise ratio of the current signal frame, and calculating the transmission sequence to get a reference channel estimation;
    completing an initial channel estimation based on the signal-to-noise ratio of the current signal frame;
    processing the estimated initial channel and the reference channel estimation through an adaptive filtering method, to obtain the estimated channel of the next signal frame;
    the signal frame comprises a PN sequence and a data block connected to a tail of the PN sequence, wherein length of the PN sequence is constant;
    the method for obtaining the signal-to-noise ratio and the reference channel comprising:
    removing a hangover of the PN sequence in the current signal frame;
    adding the hangover of the data block of the current signal frame in a head of the PN sequence of the next signal frame to the data block of the current signal frame; and
    obtaining a reconstructed circular convolution signal.

2. The channel estimation method according to claim 1, wherein the signal frame is a baseband signal proceeded with an analog-to-digital conversion, a frequency conversion, a filtering, and a sampling rate conversion; and
    a rate of the baseband signal is a single symbol rate.

3. The channel estimation method according to claim 1 wherein the method for obtaining the signal-to-noise ratio and the reference channel estimation further comprising:
    obtaining an estimated transmission sequence according to the channel of the circular convolution signal, through a hard decision of a slicer function; and
    calculating the transmission sequence to get the reference channel.

4. The channel estimation method according to claim 1, wherein the method for generating an initial channel estimation comprising:
    removing a frame header of the PN sequence of the current signal frame via the slicer function, wherein the removed frame header of the PN sequence of the current signal frame is an interference with the head of the PN sequence of the current signal frame from the hangover of the data block of the previous signal frame;
    removing the hangover of the tail of the PN sequence of the current signal frame from the head of the data block of the current signal frame; and
    obtaining a linear convolution signal.

5. The channel estimation method according to claim 4, wherein the method for completing an initial channel estimation further comprising:
    executing a frequency-domain division to the multipath signal, the PN sequence of the linear convolution signal, and the estimated signal-to-noise ratio, to obtain a frequency-domain response of the current signal frame channel.

6. The channel estimation method according to claim 5, wherein the method for completing an initial channel estimation further comprising:
    filtering and/or sampling the frequency-domain response of the current signal frame channel, to obtain an initial channel.

7. The channel estimation method according to claim 1, wherein the method comprises:
    updating a coefficient for all subcarriers of the current signal frame based on the initial channel and the reference channel estimation, and generating a channel estimation of the next signal frame by using the updated coefficient.

* * * * *

UNITED STATES PATENT AND TRADEMARK OFFICE
CERTIFICATE OF CORRECTION

PATENT NO. : 10,103,909 B2  
APPLICATION NO. : 15/560097  
DATED : October 16, 2018  
INVENTOR(S) : Zhang et al.

Page 1 of 2

It is certified that error appears in the above-identified patent and that said Letters Patent is hereby corrected as shown below:

On the Title Page

Last lines, in the Figure, delete " 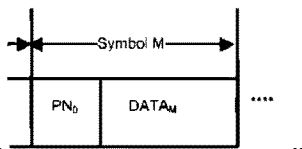 "

and insert -- 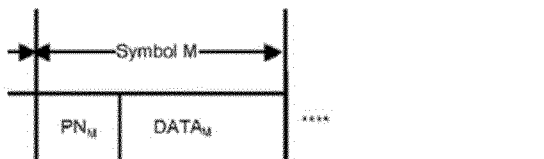 --, therefor.

In the Drawings

In Fig. 1, Sheet 1 of 2, delete " 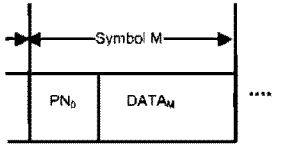 "

and insert -- 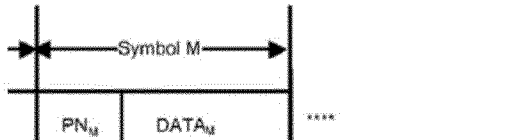 --, therefor.

In the Specification

In Column 2, Line 21, delete "comprising." and insert --comprising:--, therefor.

Signed and Sealed this  
Twelfth Day of March, 2019

Andrei Iancu  
*Director of the United States Patent and Trademark Office*

In Column 4, Line 39, delete "$Pn2\_x\_h1=pn2\% \ddot{X} \cdot h1$," and insert -- $Pn2\_x\_h1=pn2 \cdot \ddot{X} \cdot h1$ --, therefor.

In Column 5, Line 27, delete "$X$=fft([sclier_out(0:*pn_len*-1)zeros(3780–*pn_len*]);" and insert --$X$=fft([ slicer_out(0:*pn_len*-1)zeros(3780–*pn_len*)]);--, therefor.

In Column 5, Line 40, delete "sclier_out(3780–*pn_len*:3780–1)]);" and insert --slicer_out(3780–*pn_len*:3780–1)]);--, therefor.

In Column 6, Line 61, delete "(in" and insert --(m--, therefor.